United States Patent
Adelstein

(10) Patent No.: US 7,680,401 B1
(45) Date of Patent: Mar. 16, 2010

(54) PORTABLE PHOTOGRAPHY STUDIO AND METHOD OF ASSEMBLY

(76) Inventor: Alan Adelstein, P.O. Box 1450, Simi Valley, CA (US) 93062-1450

(*) Notice: Subject to any disclaimer, the term of this patent is extended or adjusted under 35 U.S.C. 154(b) by 328 days.

(21) Appl. No.: 11/866,488

(22) Filed: Oct. 3, 2007

(51) Int. Cl.
*G03B 15/00* (2006.01)

(52) U.S. Cl. .................. 396/1; 396/2; 396/3; 396/4; 396/5

(58) Field of Classification Search ............ 396/1–5; 348/722; 229/103.3; 359/599
See application file for complete search history.

(56) References Cited

U.S. PATENT DOCUMENTS

| | | | |
|---|---|---|---|
| 384,151 A | 6/1888 | Gould | |
| 1,754,663 A * | 4/1930 | Adams | 190/115 |
| 1,799,866 A | 4/1931 | Roth | |
| 2,913,569 A * | 11/1959 | Edelstein | 362/17 |
| 3,643,085 A | 2/1972 | Durand | |
| 3,967,301 A | 6/1976 | Corning | |
| 4,144,556 A | 3/1979 | Bond | |
| 4,292,662 A | 9/1981 | Gasperini | |
| 4,616,293 A * | 10/1986 | Baliozian | 362/7 |
| 4,758,856 A | 7/1988 | Moss | |
| 4,872,031 A * | 10/1989 | Baliozian | 396/3 |
| 5,067,049 A | 11/1991 | Milaire | |
| 5,077,640 A | 12/1991 | Butler, Jr. | |
| 5,235,368 A | 8/1993 | Oglesbee | |
| 6,106,124 A | 8/2000 | Tarsia | |
| 6,270,228 B1 | 8/2001 | Axen et al. | |
| 6,271,629 B1 * | 8/2001 | Pace et al. | 315/56 |
| 6,609,803 B2 | 8/2003 | Lichfield | |
| 6,659,620 B2 | 12/2003 | Goto | |
| 6,672,737 B2 | 1/2004 | Lai et al. | |
| 6,788,886 B2 | 9/2004 | Saigo et al. | |
| 6,814,468 B2 | 11/2004 | Lai et al. | |
| 7,055,976 B2 | 6/2006 | Blanford | |
| 7,396,148 B1 * | 7/2008 | Tsai | 362/352 |

\* cited by examiner

*Primary Examiner*—W. B. Perkey
*Assistant Examiner*—Linda B Smith
(74) *Attorney, Agent, or Firm*—Richard S Erbe

(57) ABSTRACT

A portable photography studio includes a carrier for transporting the components of the photography studio. The carrier is made up of a number of panels, several of which are detachable from the other panels. The main components of the photography studio include a pair of reflectors and three light diffusing screens, each of which has an edge attached to one of the panels of the carrier. When in use, the carrier panels may be detached and moved away from one another, allowing for the reflectors and screens to be pivoted about their attached edges and assembled in their proper positions for photographing objects. A background may also be attached to one of the panels and contained within the carrier. When the photographing is completed, the background, screens and reflectors may be pivoted back to their original positions and the carrier panels reassembled to form an enclosure holding all of the components. An accessories pouch for holding lighting devices may be included and positioned within the carrier during transport.

17 Claims, 8 Drawing Sheets

PORTABLE PHOTOGRAPHY STUDIO AND METHOD OF ASSEMBLY

RELATED APPLICATIONS

Not applicable.

BACKGROUND OF THE INVENTION

1. Field of the Invention

The present invention relates to the field of photography studio equipment; more specifically, the invention relates to a compact, portable photography studio that may be easily transported and carried to a desired location and quickly assembled for a photography session in a small amount of space. After the session is completed, the photography studio according to the present invention may be quickly disassembled and packaged into a compact carrier for transport to the next location or for storage.

2. General Background and State of the Art

Taking professional-style product still images for catalogs, internet auctions and the like used to require expensive lights, oversized light diffusion screens, a bulky camera tripod and a large dedicated space in which to set up. Set up and take down operations were labor-intensive and time consuming.

With the introduction of desktop photo studios, such a product called "Photo-Studio-In-a-Box"®, which was developed by the applicant, some of the problems associated with taking professional product photographs were solved. Space requirements have been dramatically reduced, for example.

However, there still remain the problems of packaging, assembling and transporting the photographic studio components, which may still be time-consuming and cumbersome.

There thus exists a need for a desktop size photo studio that may be easily packaged, transported, and assembled, while still providing the advantages of minimal space requirements and the ability to produce spectacular, crisp and clear digital images for use in product catalogs and online displays.

SUMMARY OF THE INVENTION

The disadvantages of known desktop photographic studios are overcome by the present invention, which, in a broad aspect, provides a compact photographic studio that may be conveniently packaged and transported in a light weight carrier that resembles a conventional suitcase. The carrier is made up of a number of panels, some of which are connected to one another by attachment means such as hook-and-loop type attachment strips, commonly known as Velcro®. While adhesive strips, zippers, buttons, hooks and the like could be used for attaching, Velcro is the preferred attachment means, which allows several of the panels to be selectively attached and/or detached from one another during assembly or disassembly of the photographic studio of the present invention.

A portable photographic studio according to a preferred embodiment of the present invention includes three specially woven, heat resistant nylon mesh diffusing screens that form the top and sides of a soft light box in which the object to be photographed is placed.

Two curved (preferably oval-shaped) reflectors are positioned on the sides of the light box and include openings into which studio quality, high output lamps may be mounted. In the preferred embodiment of the invention, the lamps are nine-volt compact fluorescent lamps that provide excellent even-color temperature and clarity.

A double sided non-reflective fabric background within the light box formed by the screens provides for excellent contrast with either light or dark objects and also creates an infinite depth of field.

Each screen, each reflector, and the background have an edge attached to an inner surface of one of the panels of the carrier. When the portable photography studio according to a preferred embodiment of the present invention is ready for use, the carrier is placed on its side and a flap extending from the top panel is detached from the front panel of the carrier. The two side panels of the carrier also are detached from the front panel, and the top panel, back panel, and two side panels are moved away from the front panel.

An accessories pouch, which holds the lamps, fits into the space formed between the reflectors and the screens when the portable photography studio according to the present invention is packaged for transport. The accessories pouch is attached to the front panel. When the top panel, side panel, and two side panels are moved away from the front panel, the accessories pouch is removed from the space between the reflectors and the screens and pivoted so that it moves from the inner surface of the front panel to a position disposed on the outer surface of the front panel, while still connected to the front panel.

One of the two reflectors is then pivoted along its connecting edge away from the front panel. The other reflector is then pivoted along its connecting edge away from the front panel in the direction opposite of that of the afore-mentioned reflector. Next, the side screens are pivoted along their connecting edges from the front panel and positioned so that an edge of each screen is disposed adjacent to an edge of one of the reflectors. Attachment means, preferable a Velcro strip, are attached to an edge of each of the reflectors and may be selectively attached to the adjacent edge of the screen adjacent to it.

The third screen, which forms the top of the light box, is then pivoted about its connecting edge away from the front panel. Attachment means, preferably Velcro, along the tops of the two side screens and the opposing sides of the third screen are used to selectively attach the top screen to the side screens. The background is then moved into position, so that the object to be photographed may be positioned thereon.

The lamps are removed from the accessory pouch and positioned so that they extend through openings in the reflectors (one lamp in each reflector). A camera may then be placed in front of the opening formed between the screens, the reflectors, and the front panel.

Once the photography session has ended, the procedure just described is reversed and the photographic studio of the present invention is conveniently packaged into the carrier for easy transport and storage.

Further advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of a preferred embodiment of the invention with reference to the drawings in which.

DETAILED DESCRIPTION OF THE PREFERRED EMBODIMENT OF THE INVENTION

In the following description of the invention, reference is made to the accompanying drawings, which form a part thereof, and in which are shown, by way of illustration, an exemplary embodiment illustrating the principles of the portable photography studio according to the present invention and how it may be practiced. It is to be understood that other embodiments may be utilized to practice the present invention and structural and functional changes may be made thereto without departing from the scope of the present invention. It should also be noted that terminology such as "top", "bottom", "side", etc. are for purposes of description, clarification and illustration only and should not be interpreted as limiting the scope of the invention or to the position of any of its component parts.

Figure 1:
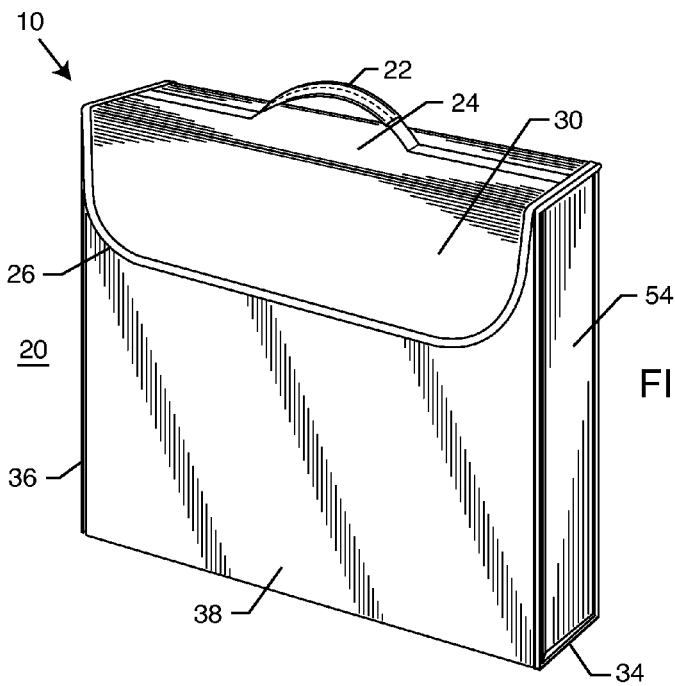
FIG. 1 illustrates a perspective view of a preferred embodiment of the carrier of a portable photography studio according to the present invention.
Figure 2:
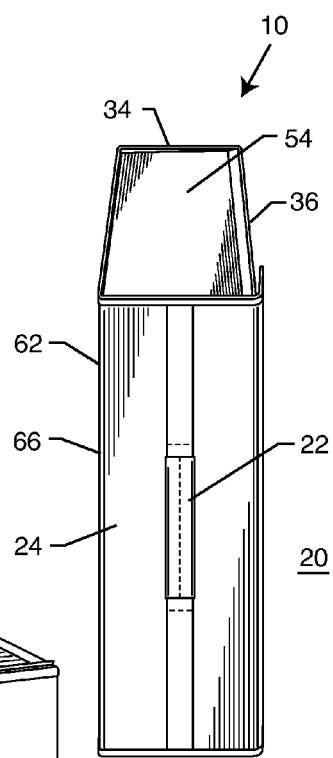
FIG. 2 illustrates a perspective view of the of a portable photography studio according to the present invention with the carrier placed on one side.
Figure 15:
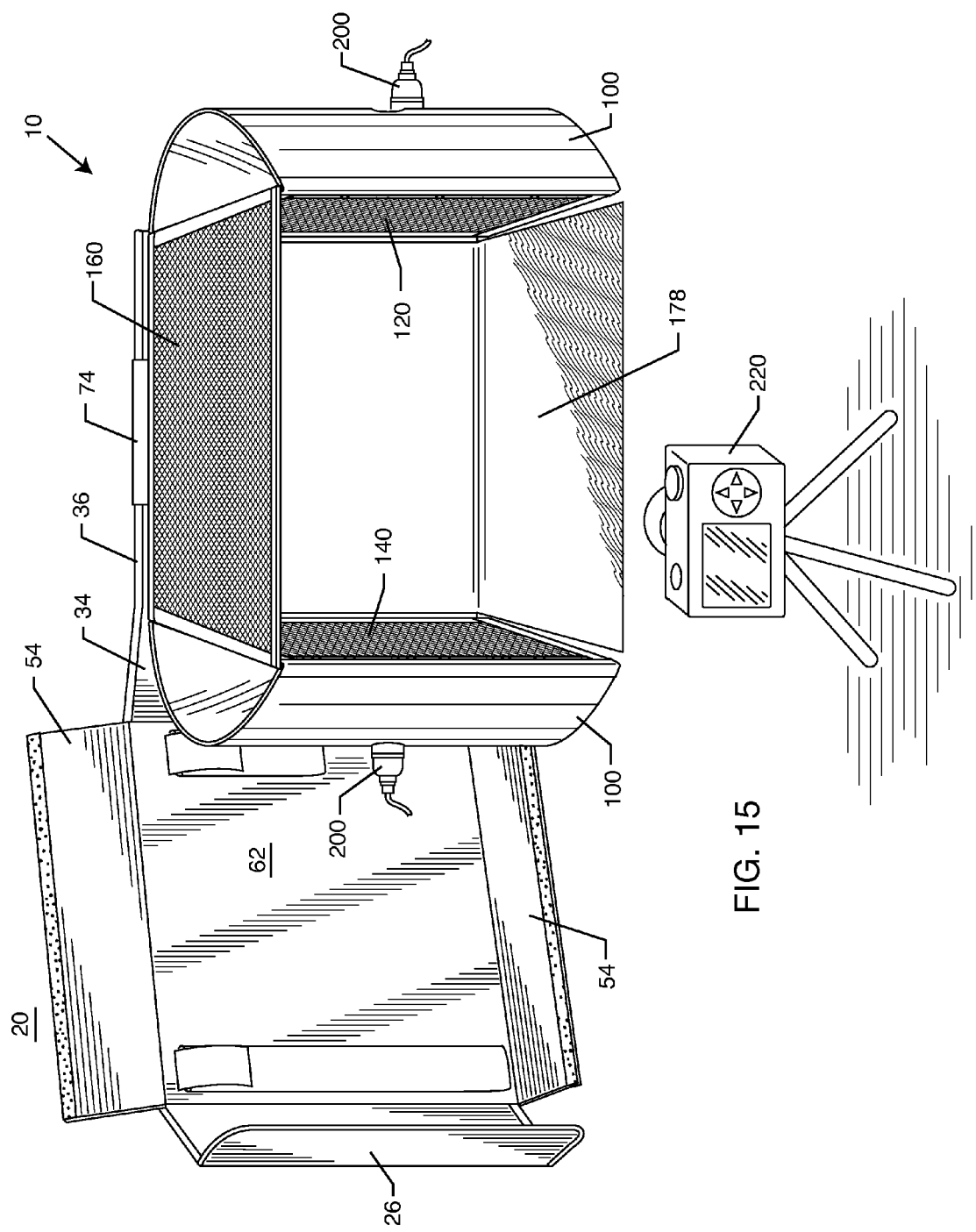
FIG. 15 illustrates a perspective view of a portable photography studio according to the present invention.

A portable photography studio according to the present invention is indicated by the numeral 10 and is best illustrated in FIGS. 1, 2, and 15. FIGS. 3-12 illustrate a sequence in which the portable photography studio may be assembled and set up for a photography session.

Studio 10 includes a carrier 20, best illustrated in FIGS. 1-5 and 10, consisting of top panel 24, flap 26 attached to top panel 24, bottom panel 34, front panel 36, back panel 62, and a pair of side panels 54. In its closed position, as illustrated in FIGS. 1 and 2, carrier 20 provides a convenient way to store and carry studio 10. Handle 22 on top of panel 24 provides an easy means for lifting and transporting studio 10.

Figure 3:
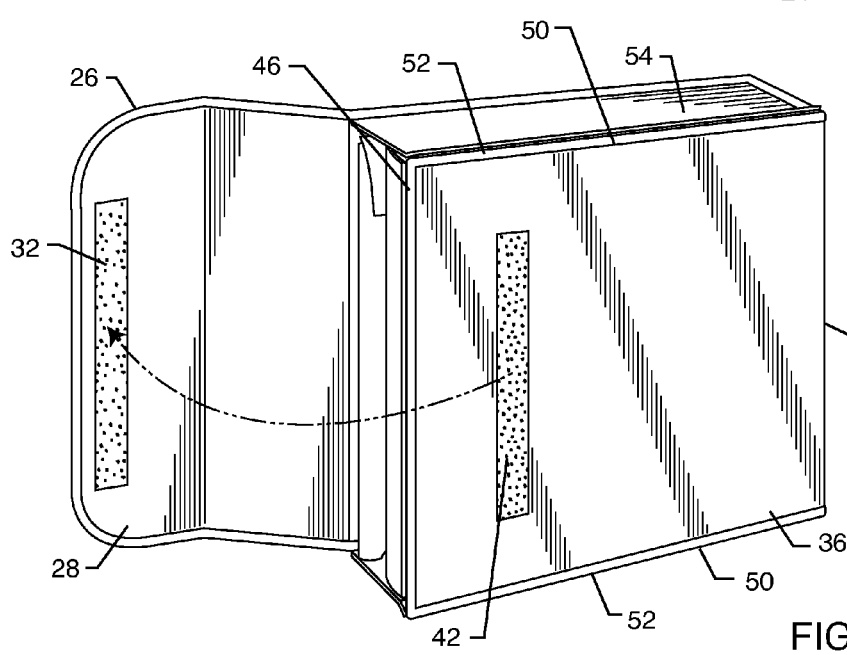
FIG. 3 illustrates a perspective view of a portable photography studio according to the present invention with the flap detached from the front panel and the top panel and flap pivoted away from the front panel of the carrier.

Flap 26 includes an inner surface 28 and an outer surface 30 (FIGS. 1 and 3). An attachment strip 32 is provided on inner surface 30. Front panel 36 includes inner surface 40 (see FIG. 10) and outer surface 38 on which is provided attachment strip 42 for attaching to flap attachment strip 32 when carrier 20 is closed. While a variety of methods and configurations of attachment may be used, such as buttons, hooks, adhesive strips, or zippers, for example, in the preferred embodiment of the invention, attachment strips 32 and 42 are of a hook and loop construction, such as Velcro®.

Front panel 36 also includes top edge 46, bottom edge 48, and opposed side edges 50. Each side edge 50 includes an attachment strip 52, which, in the preferred embodiment of the invention is of the hook and loop type, although other methods of attachment, such as adhesive strips, zippers, hooks or buttons could be used. Inner surface 40 of front panel 36 also includes an attachment strip 44 (see FIG. 10) which, in the preferred embodiment of the invention, is the hook and loop type of construction, although other types of connectors could be used, such as adhesive strips, hooks, buttons or zippers without departing from the scope of the invention. The function of attachment strip 44 is described later herein.

Each side panel 54 of carrier 20 includes a first side edge 56 and a second side edge 58. In the preferred embodiment of the invention, each first side edge 56 is attached to back panel 62, and each second side edge 58 includes and attachment strip 60 which, in the preferred embodiment of the invention, is constructed to be of the hook and loop type, although zippers, buttons, hooks or adhesive strips may be used. The use of attachment strips 60 allows the side panels 54 to be selectively attached or detached from front panel 36 for assembly or disassembly of studio 10.

Back panel 62, which is best illustrated in FIGS. 1, 2, 3 and 5, includes inner surface 64, outer surface 66, top 68, bottom 70, and a pair of opposed sides 72. One side 72 is attached to top panel 24, while the other side 72 is attached to bottom panel 34.

Studio 10 may also include one or more storage pockets 76 for holding light stands, camera stands, or other items for use with studio 10. Storage pockets 76 are attached to inner surface 64 of back panel 62.

While FIGS. 1 and 2 illustrate carrier 20, FIGS. 3-11 illustrate one method in which the panels of carrier 20 may be detached from one another and the various components of studio 10 may be assembled. When the photography session is completed, the steps of the method may be reversed and panels reattached to each other. FIG. 1 shows a front perspective view of carrier 20. To start the deployment and assembly of the components of studio 10, carrier 20 may be placed on one of the side panels 54; it should be noted, however, the carrier panels may be detached from each other and the studio assembled without first placing carrier 20 on a side panel 54.

Figure 4:
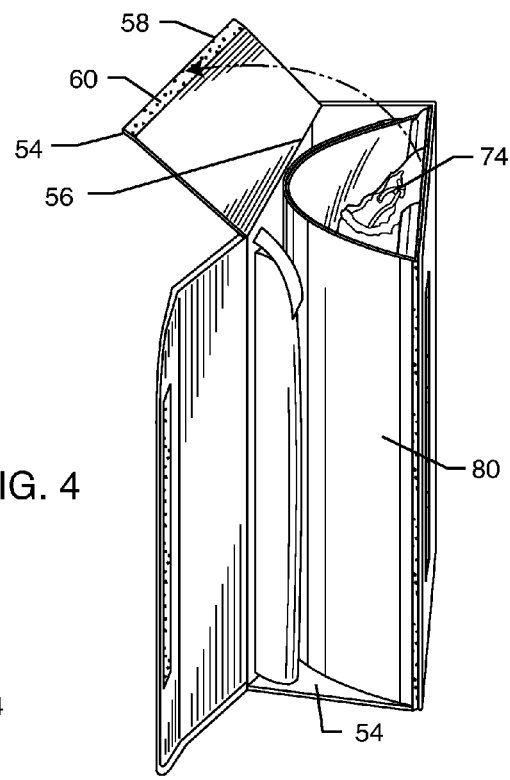
FIG. 4 illustrates a perspective view of a portable photography studio according to the present invention with one of the side panels detached from the front panel and pivoted away from the front panel of the carrier.

In FIG. 3, flap 26 is shown as it is detached from front panel 36. In FIG. 4, one side panel 54 is detached front panel 36.

Figure 5:
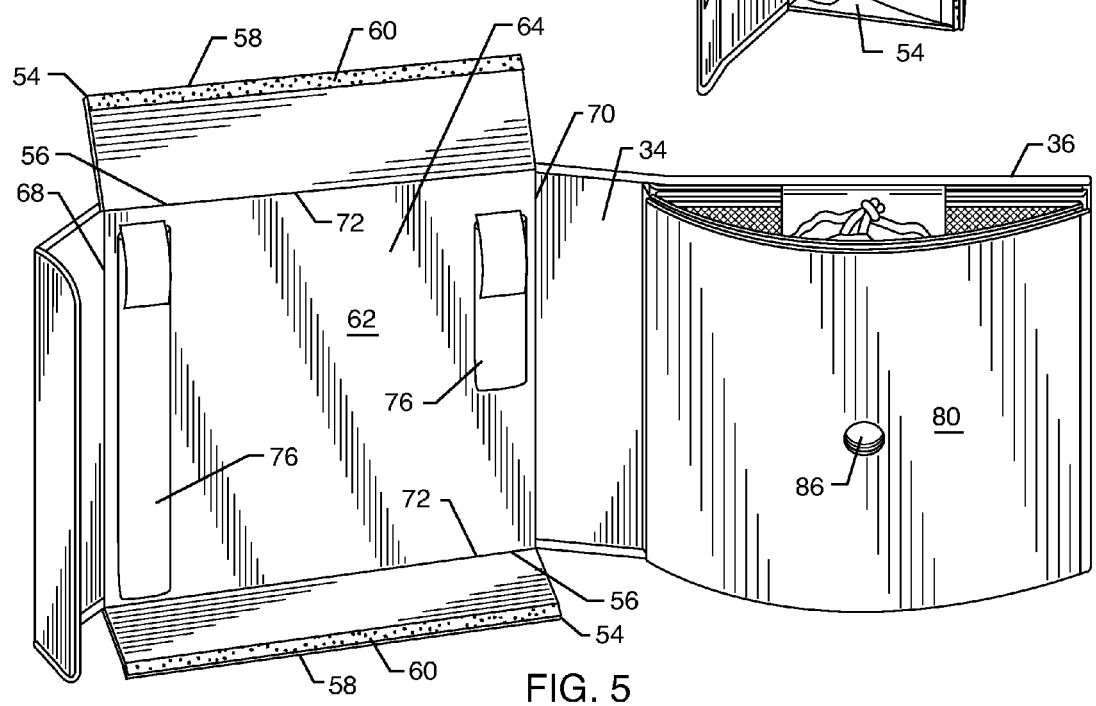
FIG. 5 illustrates a perspective view of a portable photography studio according to the present invention with the back panel, side panels and top panels all pivoted away from the front panel of the carrier.

In FIG. 5, the other side panel 54 is shown as it is detached from front panel 36, and top panel 24, side panels 54, and bottom panel 34 are moved away from front panel 36.

Figure 6:
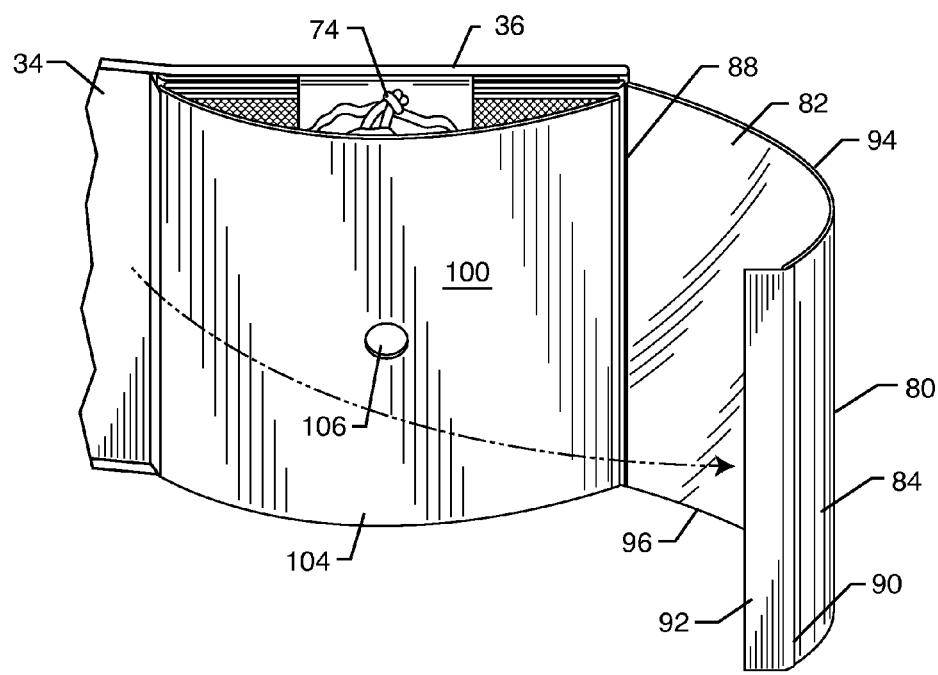
FIG. 6 illustrates a partial perspective view of a portable photography studio according to the present invention with one of the reflectors pivoted away from the front panel of the carrier.

In FIG. 6, first reflector 80 is shown as it is pivoted away from front panel 36. First reflector 80 includes a reflective surface 82, non-reflective surface 84, opening 86, first edge 88, which is attached to front panel 36, second edge 90, which includes attachment strip 92, top edge 94, and bottom edge 96. Attachment strip 92 is preferably of the hook and loop type, but other types of attachment means, such as adhesive strips, zippers, buttons, and hooks may be used. First reflector 80 pivots about first edge 88, which, as previously mentioned, is attached to front panel 36.

Figure 7:
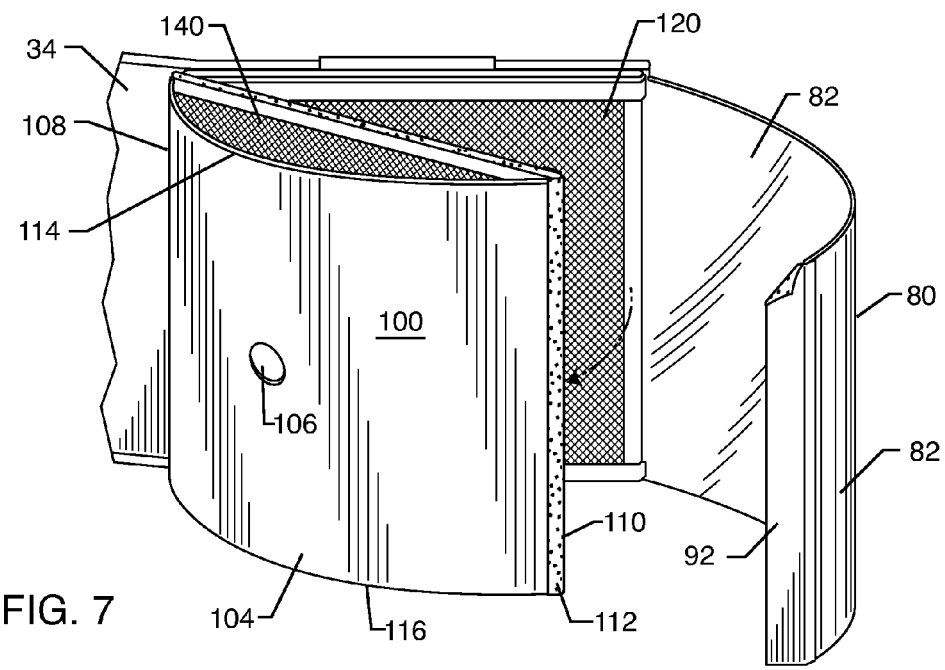
FIG. 7 illustrates a partial perspective view of a portable photography studio according to the present invention with the other reflector, one of the side screens and the accessory pouch pivoted away from the front panel of the carrier.

In FIG. 7, second reflector 100 is shown as it is pivoted away from front panel 36. Second reflector 100 includes a reflective surface 102, non-reflective surface 104, opening 106, first edge 108, which is attached to front panel 36, second edge 110, which includes attachment strip 112, top edge 114, and bottom edge 116. Attachment strip 112 is preferably of the hook and loop type, but other types of attachment means, such as adhesive strips, zippers, buttons, and hooks may be used. Second reflector 100 pivots about first edge 108, which, as previously mentioned, is attached to front panel 36.

First reflector 80 and second reflector 100 are curved reflectors which provide illumination within studio 10 from lamps mounted in opening 86 in first reflector 80 and opening 106 in second reflector 100. Details of the lamps will be described later herein. The shape and construction of reflectors 80 and 100 are new in the field of photographic studios of this type and provide advantages in increased quality of illumination and even-color temperature not provided in reflectors used with photographic studios in the prior art.

Figure 8:
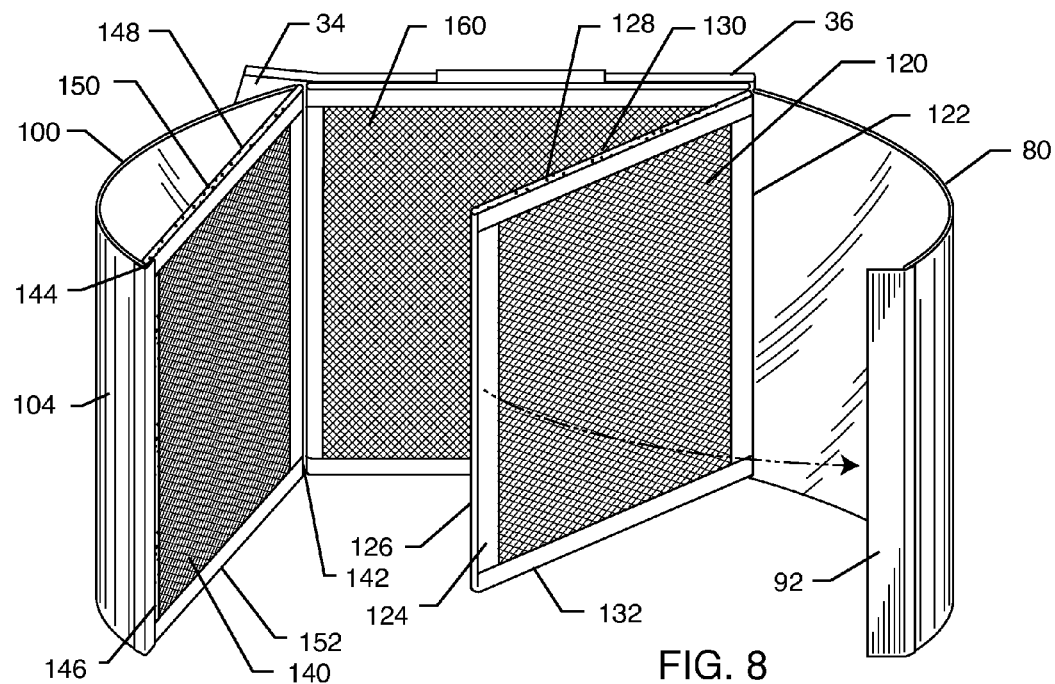
FIG. 8 illustrates a partial perspective view of a portable photography studio according to the present invention with another of the side screens pivoted away from the front panel of the carrier.
Figure 9:
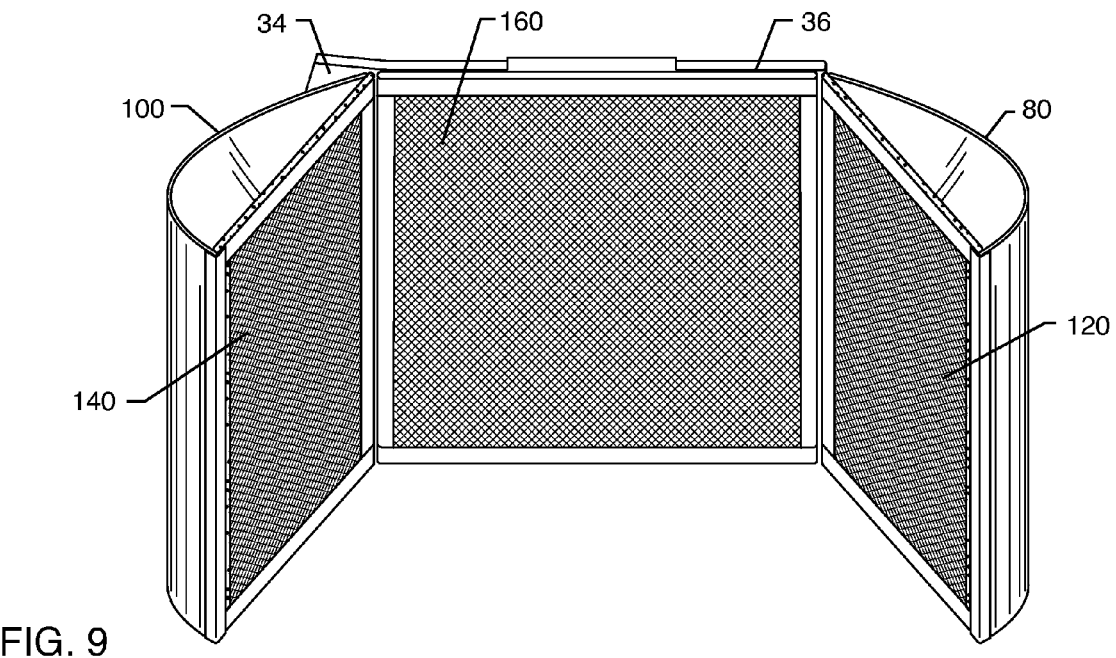
FIG. 9 illustrates a partial perspective view of a portable photography studio according to the present invention with the side screens and reflectors attached to one another and the third screen ready for deployment.

FIGS. 8 and 9 illustrate the configuration and positioning of first screen 120 and second screen 140. First and second screens 120 and 140 are preferably constructed of a special woven, heat resistant nylon mesh, which diffuses light and delivers uniform illumination in studio 10 while eliminating harsh shadows and reflective glare.

As shown in FIGS. 7 and 8, second screen 140 is pivoted about a first edge 142 attached to front panel 36. Second screen 140 includes, in addition to first edge 142, second edge 144, which has an attachment strip 146, top edge 148 having an attachment strip 150, and bottom edge 152. When studio 10 is assembled, the attachment strip 146 on second edge 144 provides a means to attach to attachment strip 112 on second edge 110 of second reflector 100 when second edge 144 and second edge 110 are adjacent one another. When studio 10 is disassembled and packaged for transport and/or storage, the respective edges may be detached from each other. In the preferred embodiment of the invention, attachment strips 146, 150, and 112 are of a hook and loop construction, although adhesive strips, buttons, snaps, hook and zippers may be used.

As shown in FIGS. 8 and 9, first screen 120 pivots about a first edge 122 attached to front panel 36. First screen 120 includes, in addition to first edge 122, second edge 124, which has an attachment strip 126, top edge 128 having an attachment strip 130, and bottom edge 132. When studio 10 is assembled, the attachment strip 126 on second edge 124 provides a means to attach to attachment strip 92 on second edge 90 of first reflector 80 when second edge 124 and second edge 90 are adjacent one another. When studio 10 is disassembled and packaged for transport and/or storage, the respective edges may be detached from each other. In the preferred embodiment of the invention, attachment strips 126, 130, and 92 are of a hook and loop construction, although adhesive strips, buttons, snaps, hook and zippers may be used.

Figure 10:
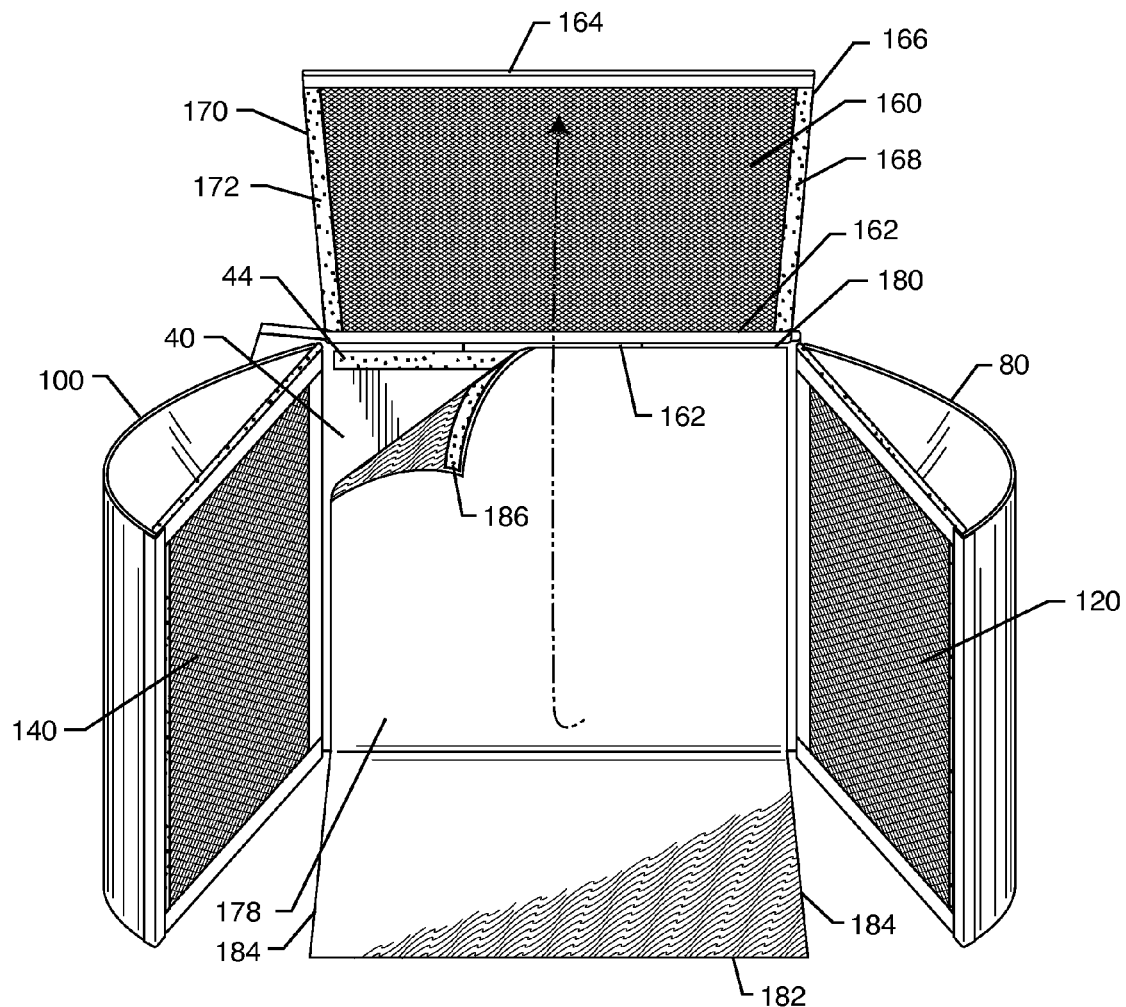
FIG. 10 illustrates a partial perspective view of a portable photography studio according to the present invention with the third screen pivoted away from the front panel of the carrier.
Figure 11:
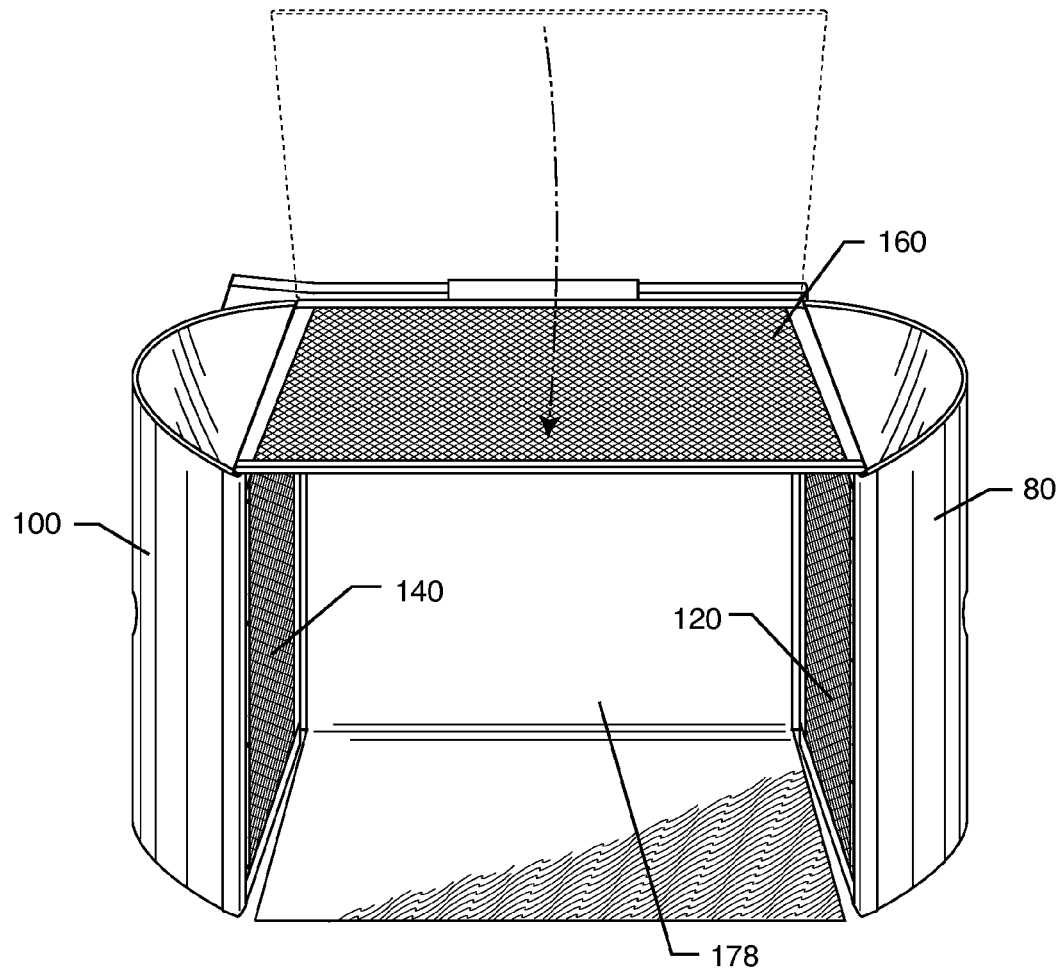
FIG. 11 illustrates a partial perspective view of a portable photography studio according to the present invention with the screens, reflectors and background in their deployed positions.

FIG. 9 shows first screen 120 attached to first reflector 80, and second screen 140 attached to second reflector 100 along the edges as previously described. FIGS. 9-11 illustrate the structure, deployment and assembly of third screen 160 and background 178. Third screen 160 is constructed of the same nylon material as first screen 120 and second screen 140. Third screen 160 includes rear edge 162, front edge 164, first side edge 166 having attachment strip 168 and second side edge 170 having attachment strip 172. Attachment strips 168 and 172 are preferably of the hook and loop type construction, although other attachment means such as adhesive strips, buttons, hooks, snaps or zippers may be used. Third screen 160 is deployed by pivoting it away from front panel 36 along rear edge 162 and positioning first side edge 166 adjacent top edge 128 of first screen 120 and attaching the edges to each other. Second side edge 170 is positioned adjacent top edge 148 of second screen 140, and the two edges are attached to each other. When studio 10 is disassembled and packaged for transport and/or storage, the respective edges may be detached from each other.

Background 178 is preferably constructed of a double sided non-reflective polyester fiber on which objects to be photographed in studio 10 are placed. Background 178 provides for excellent contrast with either light or dark objects and also creates an infinite field of depth. FIG. 10 further illustrates that background 178 includes top 180, bottom 182, a pair of opposed sides 184, and attachment strip 186 which attaches to attachment strip 44 on inner surface 40 of front panel 36.

A portable photographic studio 10 according to the preferred embodiment of the invention may also include an accessories pouch 74 attached to front panel 36 to hold lamps for storage and transport. Accessories pouch 74 is attached to inner surface 40 of front panel 36 and, when the reflectors, screens, and background are contained within carrier 10, is positioned in the space formed between the reflectors and the screens. When studio 10 is assembled, accessories pouch 74 is pivoted so that it moves from a position adjacent inner surface 40 of front panel 36 to a position adjacent outer surface 38 of front panel 36.

Figure 12:
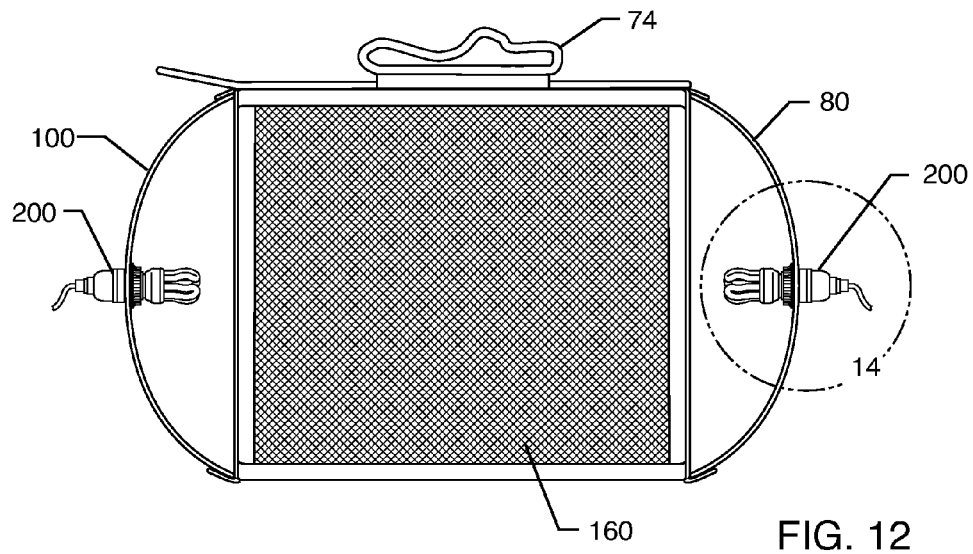
FIG. 12 illustrates a partial top view of a portable photography studio according to the present invention.

FIGS. 12 and 15 illustrate the assembled studio 10 in plan view (FIG. 12) and in perspective view (FIG. 15) with reflectors 80 and 100, background 178, and screens 120, 140 and 160 in place. In FIG. 15, camera 220 is shown placed in front of the assembled studio 10. To photograph an object, it is placed on background 178 within the space formed by the screens and reflectors.

Figure 13:
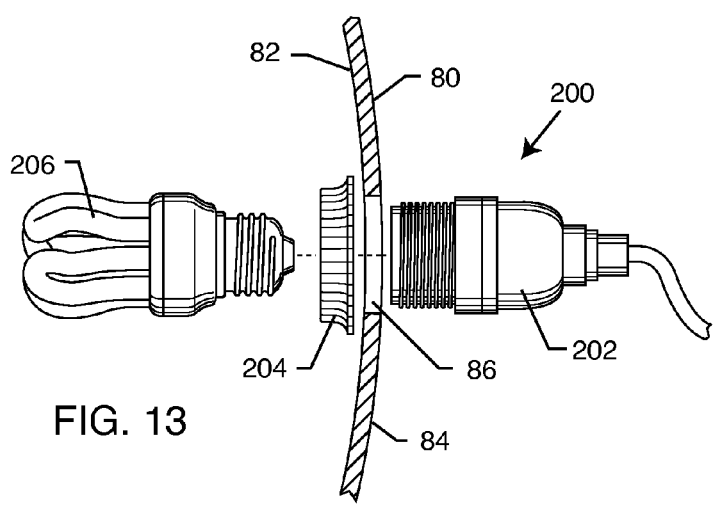
FIG. 13 illustrates a detailed view of the lamp assembly for use with a portable photography studio according to the present invention.
Figure 14:
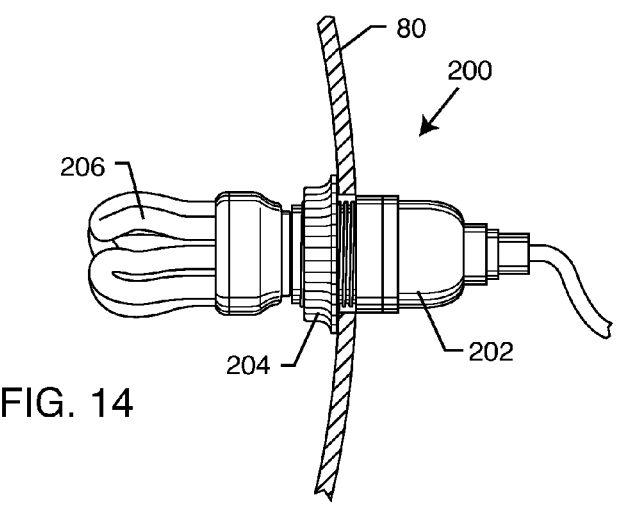
FIG. 14 illustrates a sectional view taken at circle 14 in FIG. 12.

Light is provided to illuminate the objects being photographed by lamps 200, which are shown in FIGS. 12-15. Each lamp 200 includes a fixture 202 which has a socket and an electrical cord and a bulb 206. FIGS. 13 and 14 show how lamp 200 is attached to first reflector 80. Fixture 202 is inserted through opening 86; an attachment element 204 secures fixture 202 to reflector 80. A bulb 206 is inserted in fixture 202. In the preferred embodiment of the invention, bulb 206 is a nine-volt compact fluorescent lamp for providing excellent even-color clarity. The construction of lamp 200 in second reflector 100 is identical to that of the lamp in first reflector 80.

The foregoing description of an exemplary embodiment of the present invention and a method of assembly has been presented for purposes of enablement, illustration, and description. It is not intended to be exhaustive of or to limit the present invention to the precise forms discussed. There may be, however, other configurations of photography studios not specifically described herein, but with which the present invention is applicable. For example, reflectors, screens and background may be attached to the back panel of the carrier. The present invention should therefore not be seen as limited to the particular embodiment described herein; rather, it should be understood that the present invention has wide applicability with respect to photography studios. Such other configurations can be achieved by those skilled in the art in view of the description herein. Accordingly, the scope of the invention is defined by the following claims.

What is claimed is:

1. A portable photography studio comprising:
    a carrier having a plurality of panels;
    a plurality of reflectors, each reflector having a plurality of edges, wherein at least one edge of each reflector is attached to one of said panels; and
    a plurality of screens, each screen having a plurality of edges, wherein at least one edge of each screen is attached to one of said panels.

2. The portable photography studio according to claim 1, further comprising a background attached to one of said panels.

3. The portable photography studio according to claim 1, further comprising an accessories pouch attached to one of said panels.

4. The portable photography studio according to claim 1, further comprising a plurality of storage pockets attached to at least one of said panels.

5. The portable photography studio according to claim 1, wherein each of said reflectors has a curved shape.

6. The portable photography studio according to claim 1, wherein each of said reflectors includes an opening for inserting and attaching a lamp.

7. The portable photography studio according to claim 1, wherein said carrier comprises:
    a front panel having an outer surface and an inner surface, said outer surface having an attachment strip thereon;
    a top panel having a flap, said flap having an inner surface and an outer surface, said inner surface having an attachment strip for attaching to the attachment strip on said front panel;
    a back panel attached to said top panel, said back panel having a top, a bottom and a pair of opposed sides;
    a pair of opposed side panels attached to said back panel along said opposed sides, each of said side panels including an edge with attachment means for selectively attaching and detaching from said front panel; and
    a bottom panel connected to said front panel and said back panel.

8. The portable photography studio according to claim 7, further having a graspable handle on one of said panels.

9. The portable photography studio according to claim 7, wherein said plurality of reflectors further comprises:
    a first reflector having a reflective surface and a non-reflective surface, a first edge, a second edge, a top edge and a bottom edge, said first edge attached to said front panel; and
    a second reflector having a reflective surface and a non-reflective surface, a first edge, a second edge, a top edge and a bottom edge, said first edge attached to said front panel.

10. The portable photography studio according to claim 9, wherein said second edge of said first reflector further includes an attachment strip for selectively attaching to and detaching from an edge of one of said screens, and said second edge of said second reflector further includes an attachment strip for selectively attaching to and detaching from an edge of one of said screens.

11. The portable photography studio according to claim 10, wherein said plurality of screens further comprises:
    a first screen having a first edge, a second edge, a top edge and a bottom edge, said first edge attached to said front panel; and
    a second screen having a first edge, a second edge, a top edge and a bottom edge, said first edge attached to said front panel.

12. The portable photography studio according to claim 11, further comprising a third screen having a rear edge, a front edge, a first side edge and a second side edge, said rear edge attached to said front panel.

13. The portable photography studio according to claim 12, wherein said first and second side edges may be selectively attached to and detached from said top edge of said first screen and said top edge of said second screen.

14. A method of deploying and assembling a portable photography studio comprising the steps of:
    providing a portable photography studio comprising:
        a carrier having a front panel having an outer surface and an inner surface, said outer surface having an attachment strip thereon, a top panel having a flap, said flap having an inner surface and an outer surface, said inner surface having an attachment strip for attaching to the attachment strip on said front panel, and a back panel having a top, a bottom and a pair of opposed sides attached to said top panel, a pair of opposed side panels attached to said back panel along said opposed sides, each of said side panels including an edge with attachment means for selectively attaching and detaching from said front panel, and a bottom panel connected to said front panel and said back panel;
        a first reflector and a second reflector, each reflector having a first edge, a second edge, a top edge and a bottom edge, wherein said first edge of each reflector is attached to said front panel, each reflector having a reflective surface and a non-reflective surface;
        a first screen and a second screen each having a first edge, a second edge, a top edge and a bottom edge, wherein said first edge of each screen is attached to said front panel; and
        a third screen having a rear edge, a front edge, a first side edge and a second side edge, said rear edge attached to said front panel;
    detaching said flap from said front panel;
    detaching each of said side panels from said front panel;
    moving said back panel and said side panels away from said front panel, so that said reflectors and said screens may be moved into their desired positions;
    pivoting said first reflector about its first edge away from said front panel;
    pivoting said second reflector about its first edge away from said front panel;
    pivoting said second screen about its first edge away from said front panel, so that the second edge of said second screen is disposed adjacent to said second edge of said first reflector;
    attaching said second screen to said second reflector;
    pivoting said first screen about its first edge away from said front panel, so that the second edge of said first screen is disposed adjacent to said second edge of said first reflector;

attaching said first screen to said first reflector;

pivoting said third screen about its rear edge away from said front panel, so that said first edge and said second edge of the third screen are disposed adjacent to said top edge of said first screen and said top edge of said second screen; and attaching said third screen to said first screen and said second screen.

15. The method according to claim 14, further comprising:

providing a background attached to said front panel disposed between said third screen and said front panel; and extending said background from said front panel.

16. The method according to claim 14, further comprising;

providing an accessories pouch attached to said front panel; and pivoting said accessories pouch from a position disposed adjacent said inner surface of said front panel to a position disposed adjacent said outer surface of said front panel.

17. The method according to claim 14, further comprising the step of:

prior to detaching said flap from said front panel, placing said carrier on one of said side panels.

* * * * *